United States Patent
Pitonyak et al.

(10) Patent No.: US 8,479,689 B2
(45) Date of Patent: Jul. 9, 2013

(54) OPTIMIZING MULTIPLE BOILER PLANT SYSTEMS WITH MIXED CONDENSING AND NON-CONDENSING BOILERS

(75) Inventors: Michael T. Pitonyak, Fairfield, NJ (US); Vincent S. Clerico, Fairfield, NJ (US); Pengpeng Pan, Fairfield, NJ (US)

(73) Assignee: Heat-Timer Corporation, Fairfield, NJ (US)

( * ) Notice: Subject to any disclaimer, the term of this patent is extended or adjusted under 35 U.S.C. 154(b) by 982 days.

(21) Appl. No.: 12/493,432

(22) Filed: Jun. 29, 2009

(65) Prior Publication Data
US 2010/0006042 A1    Jan. 14, 2010

Related U.S. Application Data

(60) Provisional application No. 61/079,538, filed on Jul. 10, 2008.

(51) Int. Cl.
*F22D 5/36*     (2006.01)
(52) U.S. Cl.
USPC ........................................ 122/448.3; 237/8 A
(58) Field of Classification Search
USPC ................... 122/448.3, 448.1; 237/8 A, 2 A, 237/16, 8 R
See application file for complete search history.

(56) References Cited

U.S. PATENT DOCUMENTS

| | | | | |
|---|---|---|---|---|
| 2,780,206 | A * | 2/1957 | La Rocque et al. | 122/448.3 |
| 3,576,177 | A * | 4/1971 | Block et al. | 122/1 R |
| 4,694,783 | A * | 9/1987 | Cleer, Jr. | 122/448.3 |
| 4,864,972 | A * | 9/1989 | Batey et al. | 122/448.3 |
| 6,062,485 | A * | 5/2000 | Stege et al. | 237/2 A |
| 6,536,678 | B2 * | 3/2003 | Pouchak | 237/7 |
| 7,658,335 | B2 * | 2/2010 | Johnson, Jr. | 237/8 R |
| 2005/0230490 | A1 | 10/2005 | Pouchak et al. | |
| 2005/0230491 | A1 * | 10/2005 | Pouchak et al. | 237/81 |
| 2008/0179415 | A1 | 7/2008 | Johnson et al. | |
| 2008/0179416 | A1 * | 7/2008 | Johnson et al. | 237/8 A |

FOREIGN PATENT DOCUMENTS

JP    6314236 A    6/1988

* cited by examiner

*Primary Examiner* — Gregory A Wilson
(74) *Attorney, Agent, or Firm* — Levisohn Berger LLP

(57) ABSTRACT

A system is provided to optimize multiple boiler plant systems having mixed condensing and non-condensing boiler groups. The system advantageously employs the independent groups of boilers depending on preset conditions under control of a system control unit. The preset conditions are checked against operating conditions of the boiler plant, and a system control unit controls which of the groups of boilers is the lead and which is secondary. In some instances, both groups of boilers may be utilized under heavy load. Further, effective switching between groups and within groups is also provided to minimize unnecessary repetitive boiler operation.

18 Claims, 8 Drawing Sheets

Typical Outdoor Reset Control

Note: Differential can be ±, +, or -, minus is shown

OPTIMIZING MULTIPLE BOILER PLANT SYSTEMS WITH MIXED CONDENSING AND NON-CONDENSING BOILERS

RELATED APPLICATIONS

This application claims domestic priority from U.S. Provisional Pat. App. No. 61/079,538, filed Jul. 10, 2008, and incorporates all of the teachings therein by reference.

BACKGROUND

In the past, typical conventional boilers were high water content boilers that were not designed to condense their flue gas. These non-condensing boilers operated most efficiently at high percentage output capacities. These non-condensing boilers also were limited to minimum water temperatures to prevent condensing; otherwise the boiler life would be shortened by corrosion. Therefore high (or full) capacity output together with high system temperature conditions is the preferred operating mode to achieve greater efficiencies while operating within the physical operating limits of these boilers.

A new type of high efficiency low water content boilers has been introduced into the market in recent years. These high efficiency boilers are referred to as condensing boilers because they encourage flue gas condensing which results in greater heat transfer and therefore greater operating efficiencies. However, the operating efficiency of these condensing boilers varies greatly as a function of boiler output capacity and system water temperatures. These boilers also have different physical operating limitations than conventional non-condensing boilers. These boilers are intended to operate at lower temperatures and may have high operating temperature limitations (stack temperatures or water temperatures). In summary, these boilers operate more efficiently at low percentage output capacities and low water temperatures (where condensing can occur).

The most common control system for hydronic heating systems in the market today is an indoor-outdoor reset control systems that computes the required system water temperature as a function of outdoor temperature (See FIG. 1). As the outdoor temperature decreases the desired system water temperature is increased and the control creates a demand signal for greater boiler plant capacity to achieve the higher system water temperature. Correspondingly, high outdoor temperatures directly correlate to lower system water temperatures and less boiler capacity.

Such reset control systems do not distinguish output demand signals based upon these different types of boilers. For this reason, there has been great difficulty in mixing condensing and non-condensing boilers in the same boiler plant system to take advantage of the best efficiency operating characteristics and operating physical limitations of each type of boiler because these indoor outdoor reset systems dynamically change the required system water temperature requirement.

Therefore, there is a need for a control system that will factor these different operating efficiencies and operating physical limitations into account when determining which type of boilers to operate in a mixed condensing/non-condensing multiple boiler system that uses indoor outdoor temperature reset of the system water temperature. Since high efficiency condensing boilers also are generally more expensive than non-condensing boilers, equipment capital costs can be reduced while maintaining overall heating plant efficiency by installing fewer condensing boilers to only provide a portion of boiler plant capacity at low system water temperatures, while the installed non-condensing boilers can be capable of providing 100% of the boiler plant capacity at the high system water temperatures (see FIGS. 2A and 2B). In some instances, manufacturers automatically switch to non-condensing boilers in colder weather, and use condensing boilers to achieve maximum load. Generally, in such systems high system water temperatures require greater boiler plant capacity to achieve maximum performances.

Prior art systems include that in U.S. Pat. No. 4,864,972 "Boiler Optimization for Multiple Boiler Plants" which optimizes multiple boiler selection based upon measured efficiencies at different outdoor temperatures. That system does not account for different types of boilers and the effect of different system temperatures on their efficiency or physical operating limits that results when used indoor-outdoor reset logic is applied to control system water temperature to such multiple boiler systems.

SUMMARY OF INVENTION

A system and method of optimizing boiler efficiency and maintaining boiler plant capacity in a multiple boiler plant system in which different types of boilers with different operating efficiencies and different physical operating limitations are mixed (ie condensing and non-condensing) is provided by this invention. Such system and method can be used in conjunction with a separate indoor-outdoor reset control system or directly integrate an indoor-outdoor reset of the system water temperature with its boiler sequencing logic to determine the type of boilers to be operated to achieve the desired water temperatures. The system of this invention does not directly measure individual boiler efficiency or total plant efficiency as described in prior art. The system determines which type of boilers to operate based upon a) operator programmed threshold and differentials for each type of boiler and b) system water temperature input (or other proxy parameters for system water temperature).

The control system operates the condensing boilers to certain programmed system water, outdoor temperature thresholds or other parameters and switch (or transition) to the non-condensing boilers when such threshold(s) are exceeded. (See FIG. 3) The reverse would occur for decreasing loads. Time delays, programmed differentials or other transition parameters may be used to prevent too frequent shifting between boiler types. Such programmed transition parameters and logic may also allow for both types of boilers to be operated concurrently for such transition range to enable more efficient boiler type switching during such threshold transition.

This system does not measure individual boiler efficiency but uses sensor inputs such as system temperature as a control parameter to determine which boilers to operate. Further: system conditions such as system supply, system return, individual boiler temperature or boiler header temperatures can be alternatively used as proxies for the system temperature as a control parameter. Outdoor temperature can also be reverse correlated as a proxy for system temperature. Boiler stack temperature can also be utilized and integrated as a threshold for physical operating limits. These individual parameters may be combined to form proxy information or multiple proxies. Additionally, the current boiler operating capacity may be used as a proxy.

As another alternative to system water temperature, outdoor temperature or stack temperature being used as the threshold parameters, the condensing and the non-condensing boilers may be switched based upon the boiler output of each group or the individual boiler output of all or some of the boilers in each group. As such, the firing rate control signal, delivered from the control device to the boilers may serve as the threshold sensed parameter for boiler output. Also, other proxies can be used as boiler output threshold such as gas valve position.

For example: The system may shift to non-condensing boilers when all of the condensing boilers rise to certain percent of their output capacity (as determined by the firing rate control signal to the boilers). That percentage level can be programmed into the control unit of this invention and/or can be controlled locally by the user depending upon operating conditions. Alternatively, the non-condensing boilers may be transitioned to condensing boilers when the non-condensing boilers fall to some percent of their output capacity (as determined by the firing rate control signal to the boilers). The percentage switch points may be determined by the efficiency curves of the boilers or other operating parameters.

Each boiler type may require different firing rate control methods from the control output: ie on/off firing, multiple stage firing or full modulation firing. The control method may also incorporate lead lag sequencing of full modulation burner firing for each type of boiler as described in U.S. Pat. No. 5,042,431 "Multiple Boiler Control System and Method of Operation" which is incorporated herein by reference.

Each type of boiler may also have different sequencing logic; i.e. series sequencing or parallel operation sequencing. For example, the condensing boilers may be sequenced in parallel to keep all the condensing boilers at minimum load for required capacity but the non-condensing boilers may be sequenced in series to bring each non-condensing boiler to higher (or full) capacity before firing the next non-condensing boiler.

The control system unit can be customized to identify which of the control outputs control condensing boilers and which of the controls outputs control non-condensing boilers. Alternatively the system control unit can be pre-configured to connect only condensing boilers to designated condensing boiler outputs and non-condensing boilers to only non-condensing outputs. The control system unit is also customized to establish a boiler type threshold for the control logic to transition to/from the operation of the condensing boilers to the non-condensing boilers. The logic of the control system incorporates logic for the efficiency and physical constraints of each boiler type: a) that non-condensing boilers can not be operated below condensing system temperatures (or their proxy sensor inputs) and that condensing boilers may not be operated at high system temperatures (or their proxy sensor inputs) (see FIG. 4).

The system can be operated with the same sensors as required for the indoor-outdoor reset control logic, i.e. a outdoor sensor and a system sensor. However the system may also offer the option for additional sensors if specific control parameters and/or thresholds are desired to be distinguished ie supply water temperature, return water temperatures, boiler water temperature, stack temperature etc. (See FIG. 4)

Such control system can also be used in conjunction with a separate indoor-outdoor reset control system. In such configuration, the separate indoor-outdoor reset control would determine system water temperature requirements based upon outdoor temperature and the boiler type optimization control would determine the type of boilers to be operated using similar parameters and inputs (either sensor or reset control signal) as described above. (See FIG. 4)

DETAILED DESCRIPTION OF THE PREFERRED EMBODIMENT

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Figure 1:
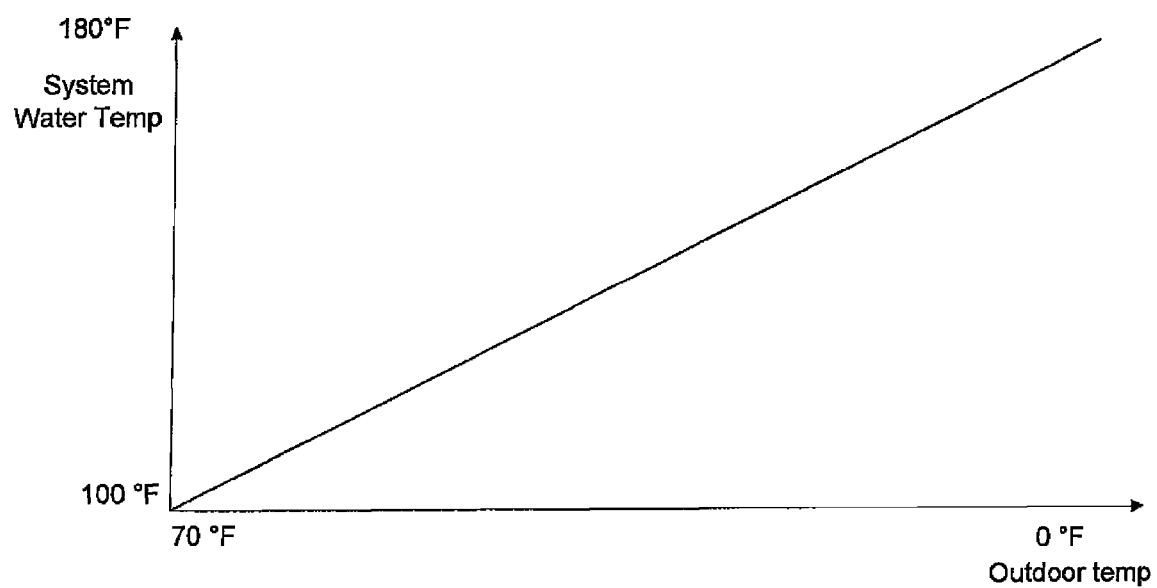
FIG. 1 is a graph of a typical outdoor reset control with the system water temperature with the Y axis for the system water temperature and the X axis for the outdoor temperature.
Figure 2A:
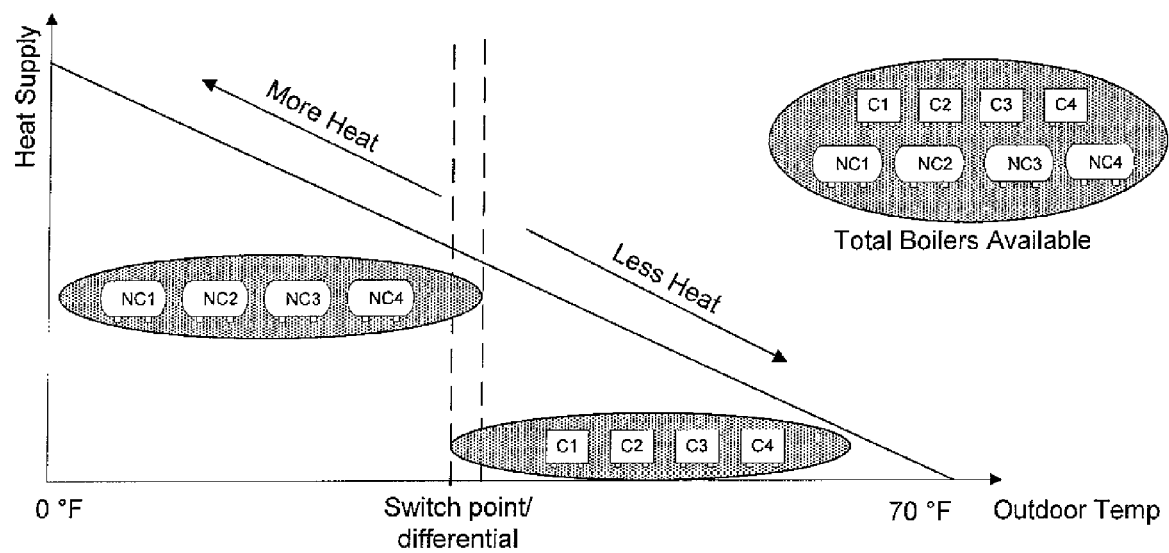
FIG. 2A is a graph between the heat supply on the Y axis and the outdoor temperature on the X axis with the outdoor temperature being shown between 0 and 70 degrees. Condensing and non-condensing boilers are illustratively shown in block form.
Figure 2B:
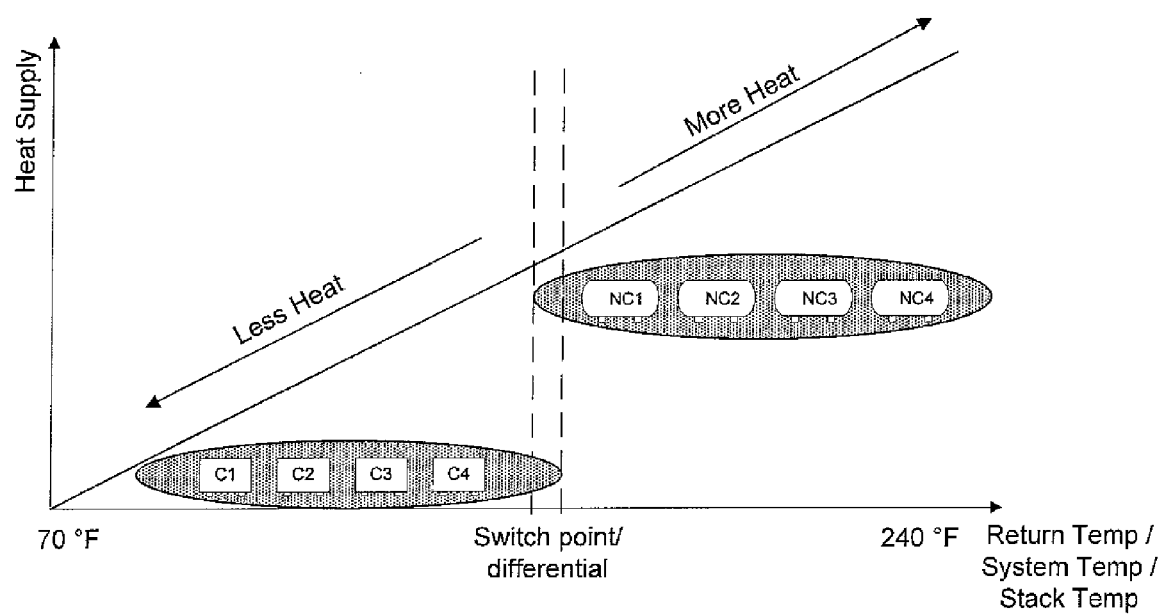
FIG. 2B is another graph with the heat supply on the Y axis and the system temperature or proxies for the system temperature on the X axis. The system temperature is shown between 70 and 240 degrees Fahrenheit. The condensing and non-condensing boilers are representatively shown.
Figure 3:
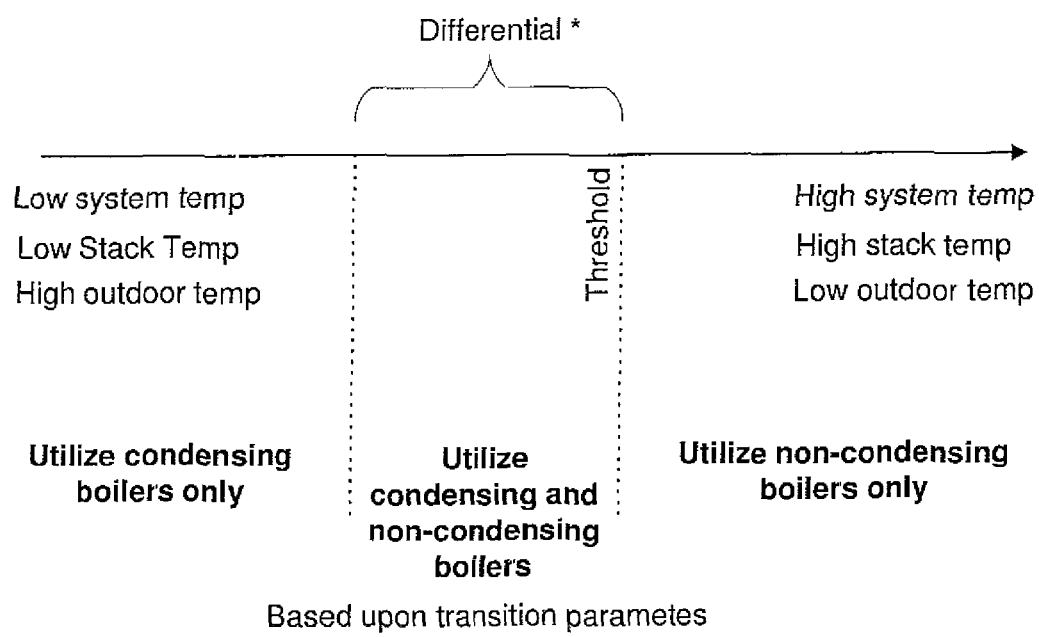
FIG. 3 is a table showing the relationship between condensing and non-condensing boilers and the differential existing between the boilers during switching.
Figure 4:
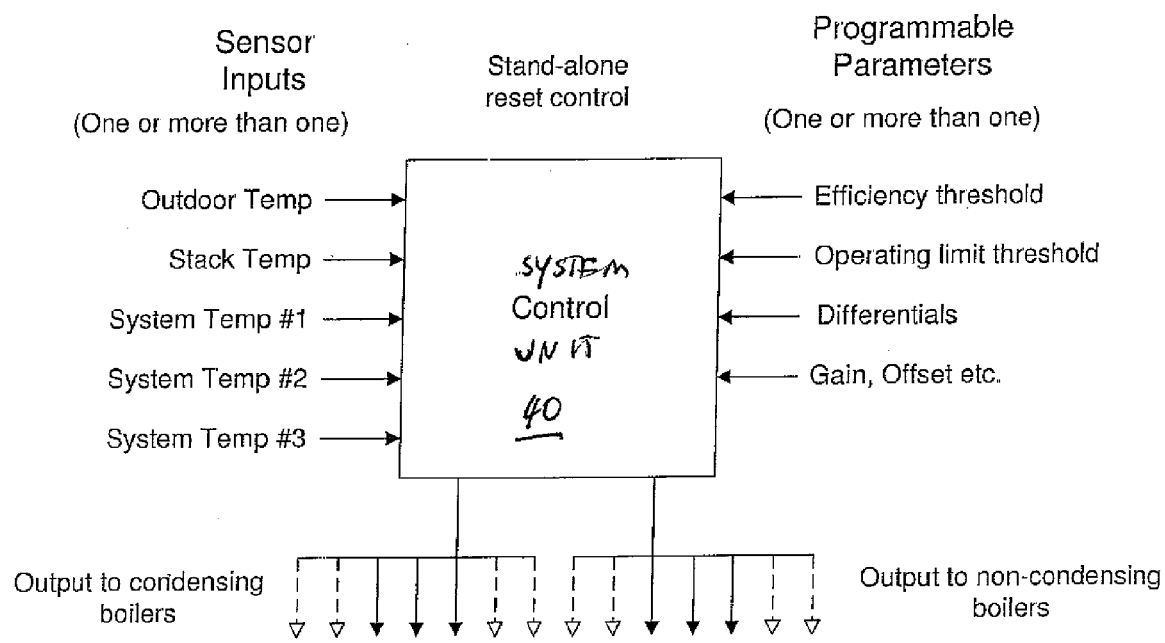
FIG. 4 is a flow chart of the system control unit which integrates various data in the system of this invention and issues control signals to the condensing and non-condensing boilers.

The central control in this invention is the system control unit 40 of FIG. 4. The system control unit is a computer processor pre-programmed to run certain operations which will be described in greater detail in FIGS. 5-7. It receives various operational parameters and controls operations of the groups of boilers and also controls operations within individual groups of boilers.

The system control unit 40 can have preset or settable threshold values or present parameters or may be individually controlled and programmed by the customer or by the installer depending upon the desired operation. Preferably, the system control unit 40 is substantially automatic and is pre-programmed or customized to the specific boiler plant installation for which the system is designed to operate.

The system control unit may be a general purpose computer specially programmed to run the processes and steps described hereinafter or could be a micro-processor pre-designed to run a series of steps with selected inputs altering the operation of the system.

Figure 5:
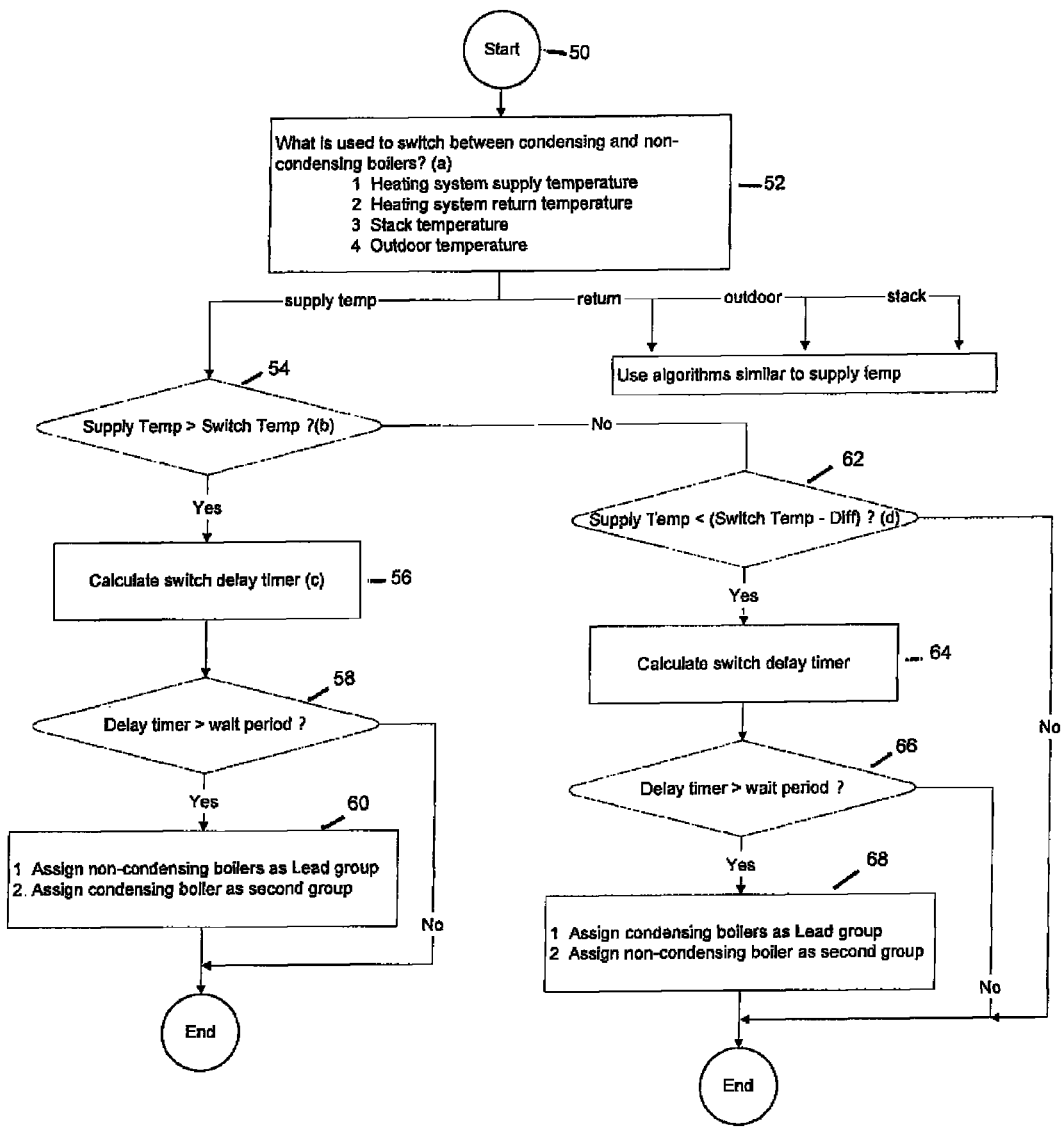
FIG. 5 is a flow chart of the system operated within the system control unit of FIG. 4 to select the lead group between condensing and non-condensing boilers.

FIG. 5 is the flow chart used to select the lead group between groups of condensing and non-condensing boilers. It switches the lead group between condensing and non-condensing boilers and each group comprises at least one of such boilers.

The system start 50 commences the operation of the system of flow chart of FIG. 5. The start could be automatically initiated upon certain operating conditions being sensed.

Block 52 illustrates the various parameters which could be used to control the switching such as heating system supply temperature, heating system return temperature, stack temperature or outdoor ambient temperature. Additionally, other proxies for such system water temperature are described in the specification. If the system supply temperature is selected, a signal reflecting such supply temperature will be directly sent to box 54 which will determine whether or not the supply temperature is greater than a selected switch temperature. These individual parameters may be combined to form proxy information or multiple proxies. Additionally, the current boiler operating capacity may be used as a proxy.

If a proxy is used to determine the boiler plant supply temperature, such as return outdoor ambient temperature or stack temperature, well known algorithms will be applied to convert such proxy to a signal reflecting the supply temperature to be supplied to block 54. If the supply temperature becomes greater than the switch temperature, that means that the temperature is higher than the switch temperature, and a change is required. Since non-condensing boilers are designed to operate at higher system temperatures while condensing boilers operate at lower system temperatures, an indication that the system supply temperature has become higher than the switch temperature is an indication to switch to the non-condensing boiler group. In particular, an indication that the supply temperature is greater than the switch temperature will lead to box 56 which will initiate a time delay for such switch, but a delay will be provided to make the switch as smooth and efficient as possible. Once the delay timer is greater than a settable wait period 58, switching to the non-condensing boiler as the lead group will be initiated as in box 60. As long as the delay timer is less than the wait period, the operating condensing boiler group would be continuing as the lead group. It is understood that there can be a period of time during which both the non-condensing and condensing boilers will concurrently operate.

Block 54 will check current supply temperature and customer switch set point as frequently as desired, and in a preferred embodiment every second. When the current supply temperature is greater than the customer switch set point for a cumulated period of time which is also settable by the user, the present invention will switch the non-condensing boiler to be the lead group.

While the supply temperature is less than the switch temperature, the condensing boilers will become the lead boilers. Block 62 checks and compares the supply temperature and switch temperature, and when the supply temperature is less than the switch temperature, a yes signal is indicated which is supplied to the switch delay timer 64. If the supply temperature is greater than the switch temperature, no shifting of lead boilers is required. If the supply temperature is less than the switch temperature, as described above, a delay timer 66 initiates a settable delay, and when the delay timer becomes greater than the wait period, an appropriate time has passed, and the condensing boilers become the lead group, and the non-condensing boilers become the second group as identified in block 68.

The system is capable of presetting or setting a switch set point temperature to be, for example, between 0 and 200 degrees F., the switch delay could be set for example, to be between 0 and 12 hours and the switch differential could be set, for example, to be between 5 and 20 degrees F. The above numbers of illustrative of preferred embodiments, and each system can be customized for automatic operation according to the desires of the user or the installer whichever is appropriate.

As stated above, the capacity threshold for the boilers may also be used as a proxy for system temperature. As another alternative to system water temperature, the condensing and the non-condensing boilers may be switched based upon the boiler output of each group or the individual boiler output of all or some of the boilers in each group. As such, the firing rate control signal, delivered from the control device to the boilers may serve as the threshold sensed parameter for boiler output. Also, other proxies can be used as boiler output threshold, such as gas valve position.

The system may shift to non-condensing boilers when all of the condensing boilers rise to certain percent of their output capacity (as determined by the firing rate control signal to the boilers). That percent level can be programmed into the control unit of this invention and/or can be controlled locally by the user depending upon operating conditions. Alternatively, the non-condensing boilers may be transitioned to condensing boilers when the non-condensing boilers fall to a certain percent of their output capacity (as determined by the firing rate control signal to the boilers). The percentage switch points may be determined by the efficiency curves of the boilers or other operating parameters.

Figure 6:
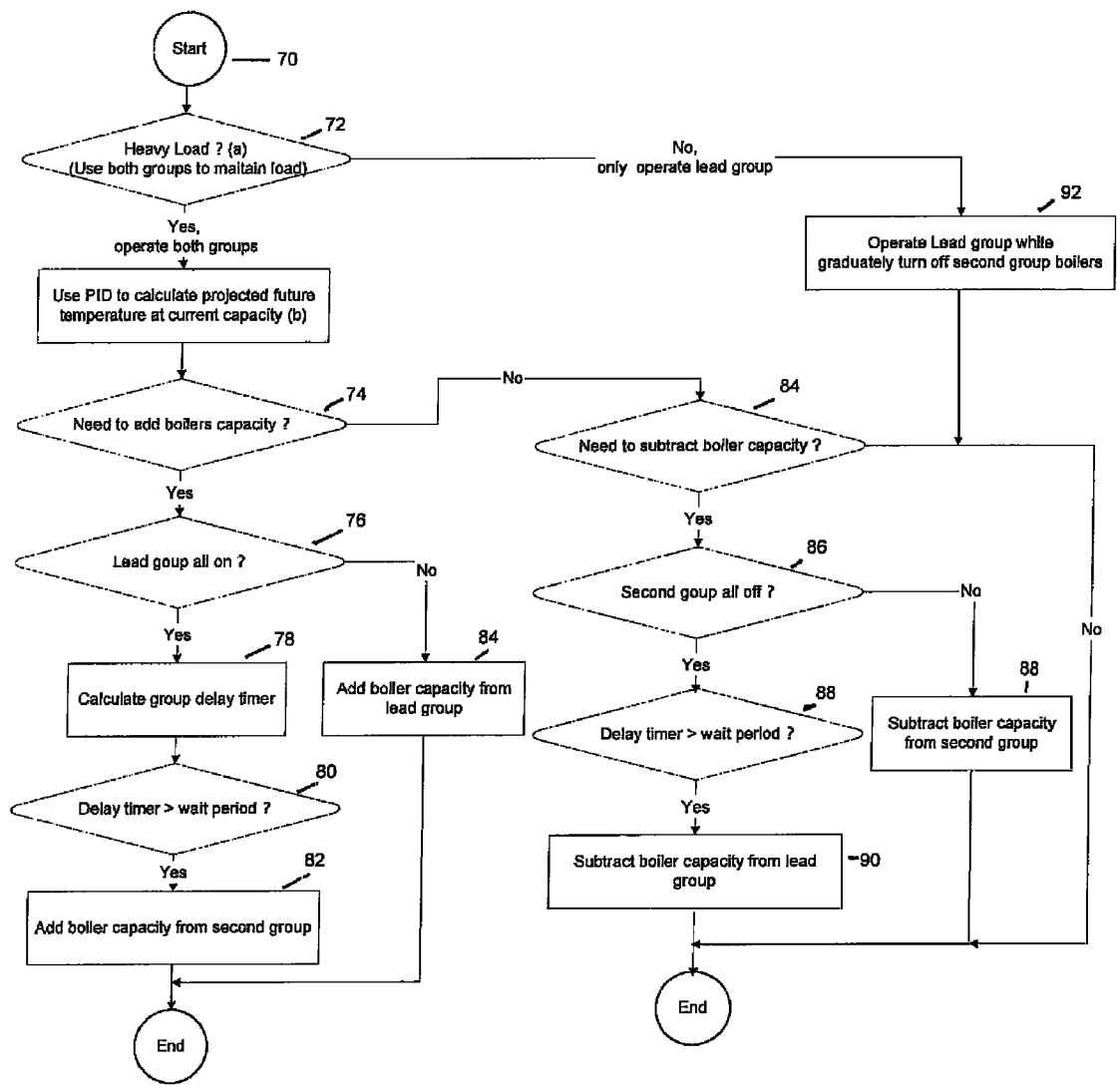
FIG. 6 is a flow chart also under control of the system control unit of FIG. 4 during the interaction between the lead and secondary group of boilers.

FIG. 6 is a flow chart identifying how the two separate groups of boilers interact with each other. As described above, there are conditions in which the boiler plant operation would be more efficient if heat were available from both groups of boilers, while one is the lead boiler group. This applies in heavy load conditions.

If a Heavy Load selection or designation is not made by the user or automatically by the system control unit, then only the lead group will operate as per block 92 which will gradually turn off the second group of the boilers. That will be the end of the operation of the flow chart of FIG. 6 when the Heavy Load condition does not apply. The Heavy Load also applies when there is an Emergency Situation needing maximum system temperature.

The start block 70 initiates the interaction between the lead and secondary group of boilers. The user can enable or disable the Heavy Load mode. If enabled, the system will concurrently run both condensing and non-condensing boilers to maintain the load, and if disabled, the system will only use the lead group to maintain the load. During system plant operation, the control of this invention may use PID or other logic systems and/or methods to project temperatures and control the boilers. Based on the projected temperature, the system control unit will add or subtract capacity to the plant system accordingly. When added capacity is required, the controller will add only the second group of boilers after all capacity in the lead group is used. When subtracting capacity, the controller will only subtract the lead group boilers after all capacities in the second group have been turned off. Preferably, there is a delay between operating the two groups of boilers in order to smooth the transition and prevent unnecessary repetitive on/off switching between the boiler groups. The PID projected temperature can be aggressive or non-aggressively designed depending upon the system operator, and one could project a desired temperature between, for example, −10 to +10° F. from current operating conditions. Experience will be a guide as to utilizing the PID projected future changes, but the system allows for relatively customized selection by the system operator.

If the Heavy Load mode is desired, as in block 72, a Yes signal will be initiated and both groups of boilers will operate as indicated in block 74. Depending on the operating conditions and system temperature, whether or not additional boiler capacitor is required will be determined in block 74. If the answer is in the affirmative, block 76 will first determine whether or not all of the boilers in the lead group are on. If all are on as indicated with answer Yes, then the secondary group of boilers will ultimately be turned on after a delay in order to smooth the transition as in block 78. Once the delay is initiated, a comparator will check whether or not the delay timer is greater than the wait period as in block 80. Once the delay time exceeds the wait period, a Yes indication is provided and boiler capacity will be added from the second group of boilers as in block 82. If it is determined at block 76 that not all the individual boilers in the lead group are on, boiler capacity will initially be added from the lead group as per block 84. Additionally, if it is determined that boiler capacity is not required in block 74, and a No signal will be supplied to the controller to determine whether or not boiler capacity should be subtracted. Again, queries are provided so if the answer is Yes, block 76 first determines whether or not all of the boilers in the secondary group have been turned off. If all are not turned off then the boiler capacity will be subtracted from the second group as in block 88. If all of the boiler capacity in the second group is already off, then a Yes is indicated, and the delay timer is again initiated as in block 88. When the delay time exceeds the present wait period, a Yes is indicated and supplied to block 90 when then subtracts boiler capacity from the lead group of boilers. As briefly described, operating delays between turning on and off individual boilers or groups of boilers ultimately adds to the efficient transition of individual or groups of boilers as per this invention.

While this invention is primarily directed to integrating condensing and non-condensing boilers within a system plant in an orderly, efficient and intelligent manner, this invention also relates to controlling the operation within individual groups of either the condensing or non-condensing boilers according to system need.

Figure 7:
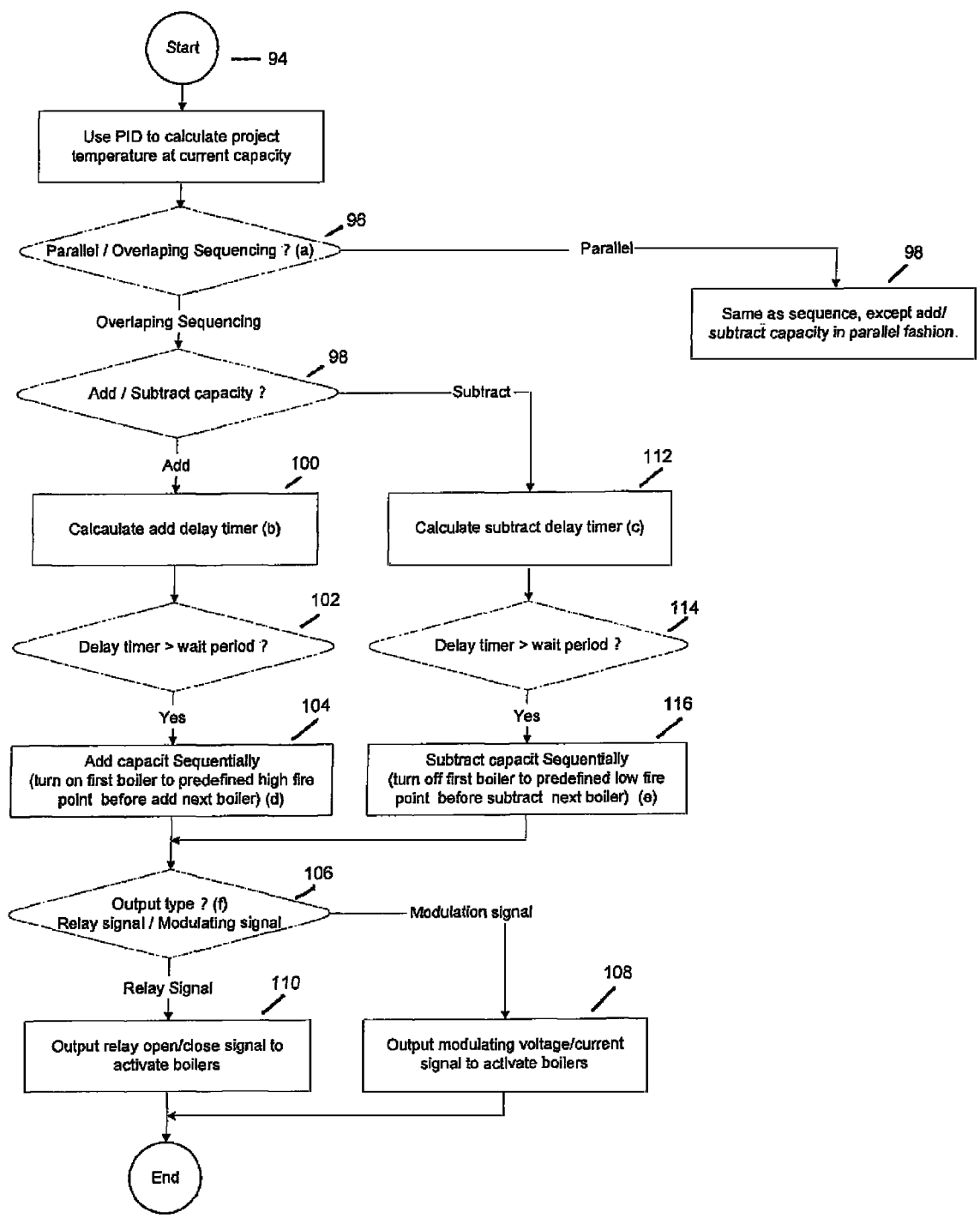
FIG. 7 is a flow chart of the condensing and non-condensing boilers operating within their own groups.

FIG. 7 is a flow chart of the operating control within individual groups whether condensing or non-condensing boilers.

The Start 94 is merely to indicate the commencement of the process to change the operation of individual boilers within respective groups of condensing or non-condensing boilers.

Generally, based on the projected temperature calculated by PID, or other logic system used, and the type of mode selected, the system control unit will either add or subtract boiler capacities in sequential or parallel fashion. The system control unit 40 provides a proper output signal to each of the boilers based on the user selection and current operating conditions. FIG. 4 provides the general overview of the operation of the system control unit 40 selecting individual ones of the boilers within one particular group or the other by directly sending signals to such boilers.

Initiation begins with the start sequence block 94 initially triggering block 96 which indicates whether or not the boilers will be operated in parallel or in overlapping sequencing. Generally, condensing boilers operate in parallel whereas non-condensing boilers are sequential. If the operation is to be in parallel, then the parallel signal will direct the system control unit 40 to sequentially add or subtract capacity in a parallel fashion as per block 98. If overlapping sequencing is required, the initial question is whether or not to subtract or add capacity as per block 98. If it is desired to add capacity, the delay timer as in block 100 will be initiated. For staging boilers, the delay timer could be between one and ten minutes, whereas for modulating boilers, a lag delay of between zero to 60 minutes would be preferred.

As per block 102 when the delay timer exceeds the settable wait period, the system control unit will initiate a signal to add capacity sequentially as per block 104 which requires that a first boiler is turned on to a predetermined firing point before adding the next boiler. Any sequential ordering of such boilers is within the choice of the system operator, so that it is not necessary that the first boiler be turned on to a predefined high fire point before adding the next boiler. For modulation boilers, such modulation start could be anywhere between 0-100%. That is only a preferred embodiment. After capacity is sequentially added, a query is provided in box 106 to determine whether or not the output is a relay signal or a modulating signal. If a modulating signal, then block 108 is initiated to provide output modulating of voltage current signal to activate the boilers.

Block 106 refers to selecting output types which is either a relay signal or a modulating signal. If a modulating boiler is selected, the output parameters could be selected to be between 4 and 20 milliamps, between 0 and 10 volts or 2 and 10 volt output signals. Further, the output parameters can be selected from the modulating signals relating to specific boiler operations. The operator can choose whatever output signals are desired, or such can be set in the system control unit 40. If the staging boiler is selected, one merely selects from an on/off two stage, three stage or four stage unit.

If the output type is a relay signal, the output relay issues an open or closed signal to activate boilers according to block 110.

If it is determined in block 98 that capacity will be subtracted, a delay timer will be initiated according to block 112. For staging boilers one could use a minimum run time of between 0 and 60 minutes, whereas for modulating boilers it would be preferable to use a soft off delay of between 0 and 60 seconds in order to minimize transition issues.

When the delay timer becomes greater than the wait period pursuant to block 114, a signal is initiated which will cause the system control unit to subtract capacity sequentially or in parallel. For example, for sequential operation one may reduce the capacity of a boiler to a predetermined low fire point before reducing the next boiler or merely modulate the lead load stage lower or otherwise just turn off the boiler before turning off the next boiler. For modulating boilers, an ignition percentage of between 1 and 50% is preferable. The output of block 116 which subtracts capacity is then supplied to the output type block 106 which is either a relay signal or a modulating signal which was described above.

The flow charts 5-7 are the processes run in the system control unit 40, and the connections to control the individual boilers is that shown by the system control unit 40 in FIG. 4. Signal control unit 40 runs the computer processes described above, and issues signals to the condensing or non-condensing boilers. Signal control unit 40 is supplied with a plurality of operating conditions from sensors and utilizes preset or settable parameters to integrate into the various automatic processes it directs to provide the novel and optimized multiple boiler plant with mixed groups of condensing and non-condensing boilers. These are identified in FIG. 4.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A control system for a multiple boiler plant with mixed condensing and non-condensing boilers comprising:

a system control unit;

a plurality of boilers said boilers being separated into separate condensing and non-condensing groups each of said groups having at least one boiler, said system control unit receiving a system threshold level to select which of said separate groups shall serve as lead boiler group for a selected boiler operating condition, said system threshold comprising a desired water supply temperature;

an operation condition sensor for sensing system operating conditions, said system control unit receiving information from said operation condition sensor, said system control unit further receiving customer programmed parameters, whereby said operation conditions and said customer programmed parameters are used to determine said desired water supply temperature;

said desired water supply temperature being stored by said system control unit, said system control unit receiving a selected switch temperature, said switch temperature comprising a temperature switch point;

comparator means to compare said desired water supply temperature with said temperature switch point to generate a control signal to control which separate group shall be the lead group in response to a control signal provided by said comparator means.

2. A control system as set forth in claim 1, wherein said customer programmed rammed parameters comprises either sensor or reset control signals.

3. A control system as set forth in claim 1, wherein said desired water supply temperature is determined by a proxy for the boiler plant system water temperature.

4. A control system as set forth in claim 3, wherein said proxy is selected from a group consisting of boiler header temperature, and boiler stack temperature.

5. A control system as set forth in claim 1, wherein said system control unit comprises means to delay switching between said groups of boilers after a preset operating condition is reached.

6. A control system as set forth in claim 5, wherein said means to delay switching comprises a dynamic delay signal related to boiler operating conditions.

7. A control system as set forth in claim 1, wherein said customer programmed parameters include the date.

8. A control system as set forth in claim 1, wherein said customer programmed parameters comprises the time of day.

9. A control system as set forth in claim 1, wherein said control system prevents said non-condensing boilers from operating below condensing boiler plant system temperatures.

10. A control system as set forth in claim 9, wherein said control system prevents said condensing boilers from operating at high boiler plant system temperatures.

11. A control system as set forth in claim 1, further comprising transition parameters minimizing unnecessary switching between boiler groups.

12. A control system as set forth in claim 1, wherein the system control unit comprises means to enable concurrent running of both groups of boilers.

13. A control system as set forth in claim 1, wherein each of said groups comprises at least two of said condensing or non-condensing boilers.

14. A control system for a multiple boiler plant with mixed condensing and non-condensing boilers comprising:

separating a plurality of boilers into separate condensing and non-condensing groups, setting a system threshold to select which of said groups shall serve as lead boiler group for a selected boiler operating condition, said system threshold comprising a desired water temperature, said desired water temperature being determined by a plurality of settable parameters relating to the operation of said condensing and non-condensing boilers within said groups of said condensing and non-condensing boilers, said desired water temperature being stored in a system control unit therein, boiler operating condition sensors to provide the operating conditions of said boilers, said system control unit selecting from said separate groups of boilers to control which group shall be the lead group in response to said system threshold.

15. A control system as set forth in claim 14, wherein said boiler operating conditions comprise the boiler outputs of each of said groups.

16. A control system as set forth in claim 14, wherein said operating conditions comprise firing rate control signals.

17. A control system for a multiple boiler plant with mixed condensing and non-condensing boilers comprising:

at least two groups of boilers, said at least two groups of boilers comprising a group of condensing boilers, said group of condensing boilers comprising at least one condensing boiler and a group of non-condensing boilers, said group of non-condensing boilers comprising at least one non-condensing boiler;

a system control unit, said system control unit determining which one of said at least two groups of boilers is a lead group of boilers;

said system control unit receiving a selected switch temperature, said switch temperature comprising a temperature switch point;

an operation condition sensor for measuring system water temperature;

said system control unit comparing said system water temperature with said temperature switch point, whereby when said system water temperature is less than said temperature switch point, said group of condensing boilers is selected as a lead group of boilers and when said system water temperature is greater than said temperature switch point, said group of non-condensing boilers is selected as a lead group of boilers.

18. A control system for a multiple boiler plant with mixed condensing and non-condensing boilers comprising:

at least two groups of boilers, said at least two groups of boilers comprising a group of condensing boilers, said group of condensing boilers comprising at least one condensing boiler and a group of non-condensing boilers, said group of non-condensing boilers comprising at least one non-condensing boiler;

a system control unit, said system control unit determining which one of said at least two groups of boilers is a lead group of boilers;

said system control unit receiving a selected switch temperature, said switch temperature comprising a temperature switch point;

said control unit receiving proxy information for system water temperature to determine which of said at least two groups of boilers is a lead group of boilers;

said system proxy information comprises at least one of stack temperature information and boiler firing rate information;

said system control unit comparing said proxy information for system water temperature with said temperature switch point, whereby when said proxy for water temperature is less than said temperature switch point, said group on condensing boilers is selected as a lead group of boilers and when said proxy for system water temperature is greater than said temperature switch point, said group of non-condensing boilers is selected as a lead group of boilers.

\* \* \* \* \*